UNITED STATES PATENT OFFICE.

BUEL SMITH, OF GLENS FALLS, NEW YORK, ASSIGNOR TO GENERAL ELECTRIC COMPANY, A CORPORATION OF NEW YORK.

PROCESS OF COATING BY MEANS OF EMULSIONS.

1,266,335.  Specification of Letters Patent.  Patented May 14, 1918.

No Drawing.  Application filed November 6, 1917.  Serial No. 200,602.

*To all whom it may concern:*

Be it known that I, BUEL SMITH, a citizen of the United States, residing at Glens Falls, county of Warren, State of New York, have invented certain new and useful Improvements in Processes of Coating by Means of Emulsions, of which the following is a specification.

The present invention comprises a process of separating the oil-phase from the water-phase of an emulsion, and it relates particularly to the application of oleaginous material, such as japan, upon a solid object.

In accordance with my invention a solid object heated to an elevated temperature, preferably materially above 100° C., is immersed in the emulsion, thereby causing an expulsion of the water-phase adjacent the heated object and a deposition of dehydrated oil-phase upon the object.

In carrying out my invention, for example, with an emulsion of oleaginous material, such as japan base comprising an asphalt and an oil, the object to be coated is heated in an oven to the desired temperature, preferably to about 250° C. and the heated object is plunged into the cold emulsion and then withdrawn.

In some cases the object may be withdrawn while still more or less heated causing changes in the japan due to heat to take place progressively from the inside to the outside of the coating. In this way volatile products may escape from the interior layers of the coating before an impermeable layer has been formed on the surface.

After thus dipping the object in the water japan and removing, the coated object may be baked in the usual way.

This method of applying japan is particularly adapted to coating objects which can be freed from grease or other volatile matter by heating as the heat may thus be conserved by immediately dipping the object while still hot in the emulsion. My invention is well adapted to the coating of non-conducting objects such as porcelain, which cannot be coated by electrolysis of the japan emulsion.

What I claim as new and desire to secure by Letters Patent of the United States, is:—

1. The process of applying on a solid object an oleaginous material contained as an emulsion in water which consists in dipping said object while heated into said emulsion.

2. The process of applying on a solid object a japan contained as an emulsion in water which consists in dipping said object while heated to a temperature above 100° C. into said emulsion.

3. The process of separating the oil-phase from the water-phase of an emulsion which consists in bringing into contact with said emulsion a solid object heated to a temperature above 100° C.

In witness whereof, I have hereunto set my hand this 5th day of November, 1917.

BUEL SMITH.